(12) United States Patent
Romero Magariño et al.

(10) Patent No.: US 6,178,605 B1
(45) Date of Patent: Jan. 30, 2001

(54) SYSTEM FOR COUPLING AND FIXING PLASTIC MATERIAL ACCESSORIES TO MODULAR SELF-SUPPORTING ELEMENTS AND THE LATTER TO THE VEHICLE BODYWORK

(75) Inventors: Antonio Romero Magariño; Felipe Barrero Serrano, both of Burgos (ES)

(73) Assignee: Irausa Ingenieria, S.A., Burgos (ES)

( * ) Notice: Under 35 U.S.C. 154(b), the term of this patent shall be extended for 0 days.

(21) Appl. No.: 09/202,356

(22) PCT Filed: Apr. 21, 1998

(86) PCT No.: PCT/ES98/00104

§ 371 Date: Dec. 14, 1998

§ 102(e) Date: Dec. 14, 1998

(87) PCT Pub. No.: WO98/47741

PCT Pub. Date: Oct. 29, 1998

(30) Foreign Application Priority Data

Apr. 22, 1997 (ES) .................................................... 9700870

(51) Int. Cl.[7] ........................................................ F16B 5/06
(52) U.S. Cl. .................................. 24/292; 24/297; 24/453
(58) Field of Search ............................... 24/292, 297, 457, 24/453, 458, 488, 573.1, 573.7; 411/41, 45–48, 340, 344, 345, 346, 57.1, 60.3; 248/231.91, 231.2, 231.3

(56) References Cited

U.S. PATENT DOCUMENTS

| | | | | |
|---|---|---|---|---|
| 2,402,287 | * | 6/1946 | Kearns | 411/41 |
| 2,627,094 | | 3/1953 | Bedford | 24/73 |
| 4,312,614 | * | 1/1982 | Palmer et al. | 24/297 X |
| 4,804,303 | * | 2/1989 | Statkus | 411/48 X |
| 4,981,322 | * | 1/1991 | Dowd et al. | 24/297 X |
| 5,028,187 | * | 7/1991 | Sato | 411/48 |
| 5,290,137 | * | 3/1994 | Duffy, Jr. | 411/60 |
| 5,409,336 | * | 4/1995 | Jericevich et al. | 411/48 S |
| 5,507,545 | * | 4/1996 | Krysiak | 24/453 X |
| 5,759,002 | * | 6/1998 | Essenberg | 24/297 X |
| 5,920,957 | * | 7/1999 | Wagner | 411/45 X |

FOREIGN PATENT DOCUMENTS

| | | |
|---|---|---|
| 0088931 | 9/1983 | (EP) . |
| 2064444 | 2/1995 | (ES) . |
| 9523294 | 8/1995 | (WO) . |
| 9617178 | 6/1996 | (WO) . |

\* cited by examiner

*Primary Examiner*—Robert J. Sandy
(74) *Attorney, Agent, or Firm*—Ladas and Parry

(57) ABSTRACT

The system is designed to definitely couple and fix a mechanism and/or accessory (1) in the interior of a motor vehicle, the mechanism (1) including a pyramid-shaped protuberance (2) with a fixed (5) and a resilient (6) portion, and a skirt (4) in which a slot (3) is provided, wherein upon the passage of such pyramid-shaped protuberance (2) through a hole (8) purposely made in the self-supporting element (7) of the vehicle at issue, which self-supporting element may be the ceiling, a door panel, etc., it is held on a resilient plastic blade (9) in a window (10) identical with that purposely provided in the vehicle bodywork (13), wherein a supplementary wedge element (11) inserted through the bottom, on the pyramid-shaped protuberance (2), definitely fixes said mechanism or accessory (1), the slot (3) thereof leaving the thickness of the resilient blade (9) and the vehicle bodywork shell. The system allows an easy pre-fitting and definitive mounting, and the replacement of the mechanisms and/or accessories on their own, and indeed of the assembly fixed to the actual bodywork, for the purpose of inspection, repair or replacement.

8 Claims, 7 Drawing Sheets

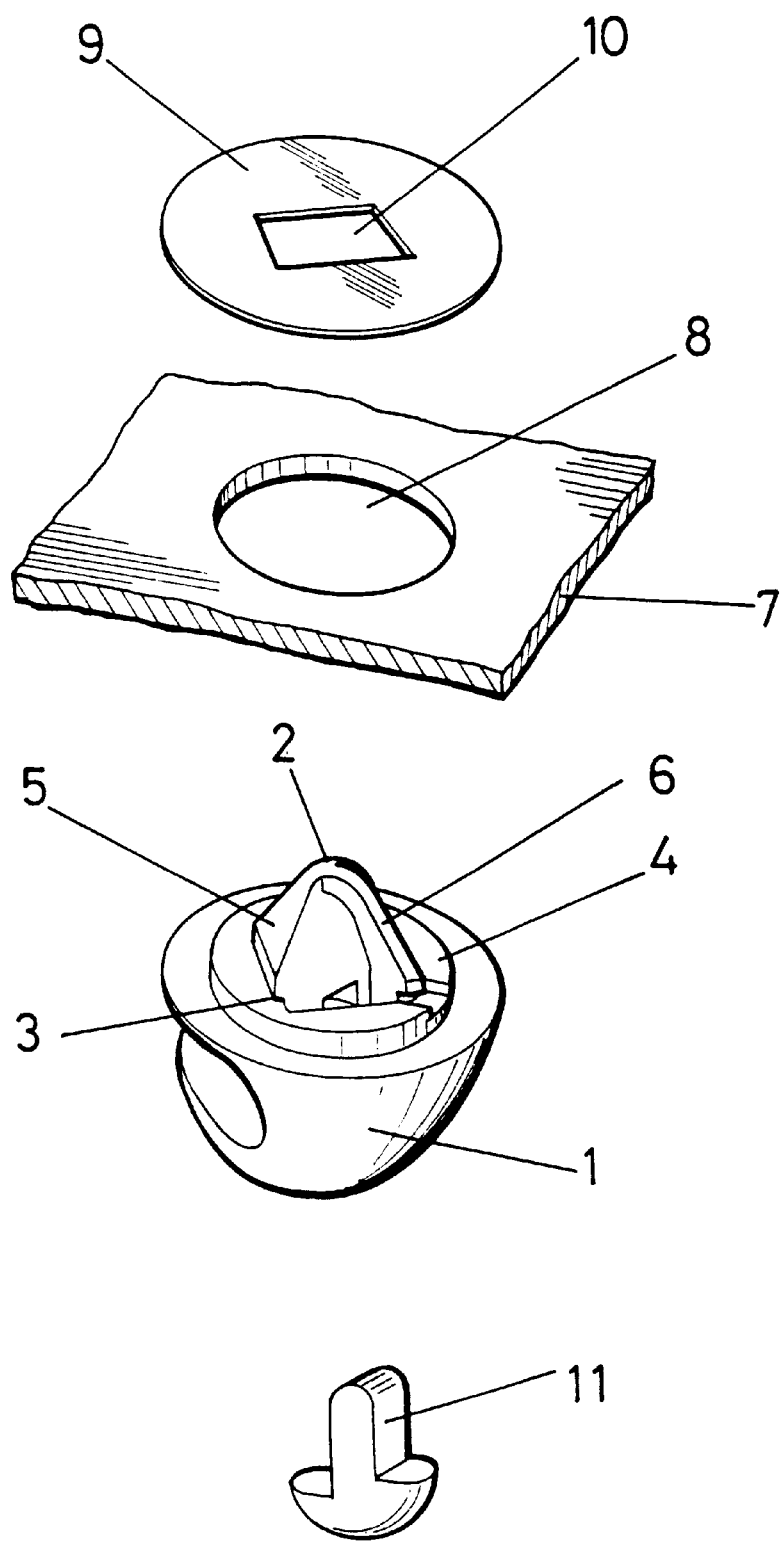

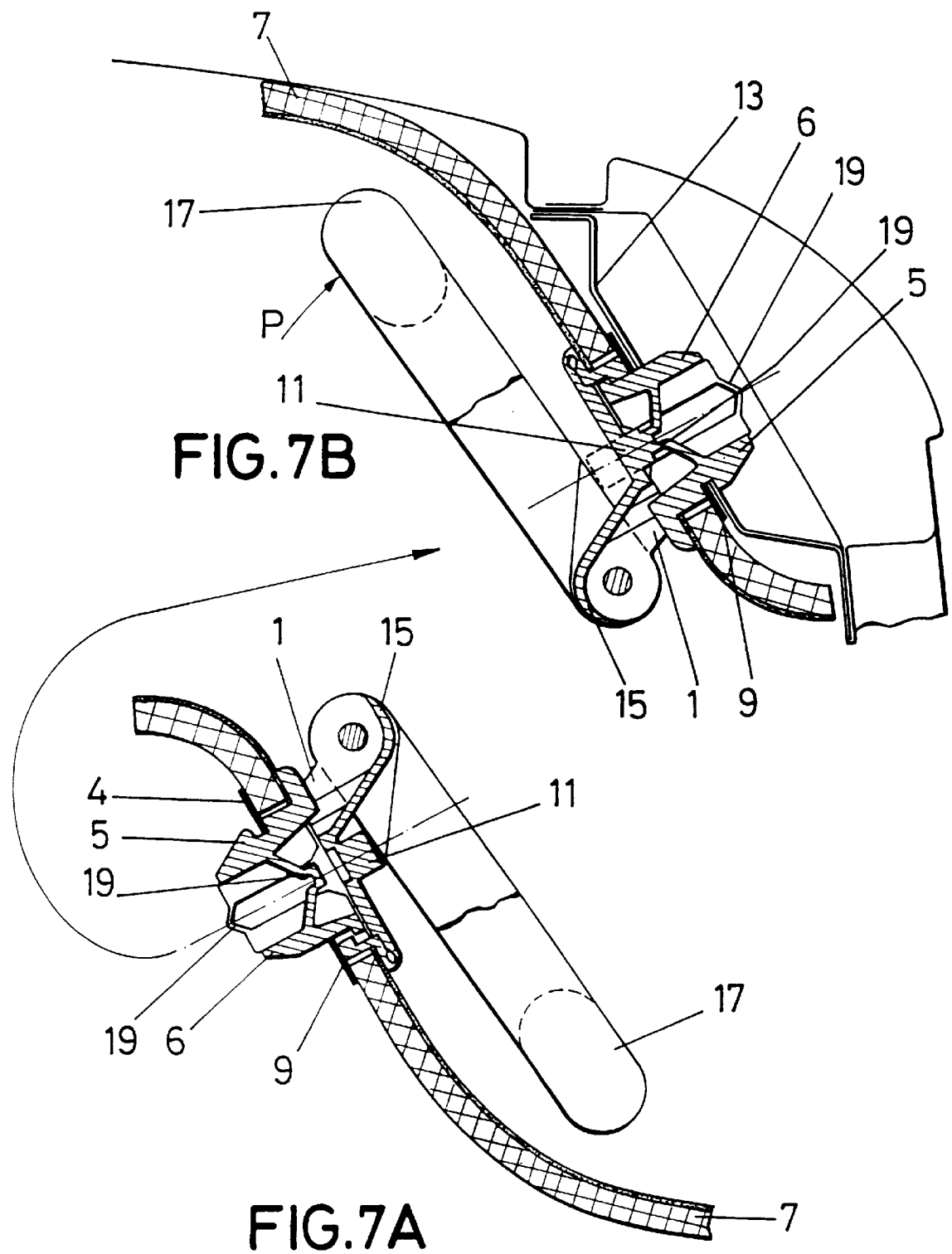

SYSTEM FOR COUPLING AND FIXING PLASTIC MATERIAL ACCESSORIES TO MODULAR SELF-SUPPORTING ELEMENTS AND THE LATTER TO THE VEHICLE BODYWORK

OBJECT OF THE INVENTION

The invention relates to a system for fixing mechanisms and/or accessories that are usually made of plastic and fitted in the interior of motor vehicles, which fixing takes place through the modular elements constituting the ceilings, panels, inlaid work of linings, etc., in order to be definitively fixed in the holes purposely made in the bodywork shell of the relevant vehicle.

The object of the invention is to provide a system for coupling and fixing plastic material accessories to modular self-supporting elements and the latter to the bodywork of motor vehicles, by inserting a resilient plastic device integrated in the actual accessories and/or mechanisms, in windows purposely provided in the structural elements of the latter, although for a definitive arrangement, the device may be previously coupled to and supported on the relevant modular self-supporting element, thereby to allow manipulations to be made until the accessory or mechanism is definitively fitted in the vehicle.

BACKGROUND OF THE INVENTION

Certain accessories and/or mechanisms mounted in the interior of vehicles, such as hangers, grips, door handles, etc., are fixed by means of elements that cross the ceiling, door panels, etc., and are anchored in windows or holes purposely provided in the vehicle bodywork shell.

Plastic parts are normally used in systems used for this mounting and fixing, which are attached on the one hand to the accessory or mechanism at issue, passing through the self-supporting elements and being anchored in the window of the vehicle bodywork shell.

Currently known mechanisms or means to carry this out have a number of drawbacks and disadvantages, namely that they are difficult to disengage in order for the accessory to be dismounted and/or replaced, wherever this is necessary, indeed resulting in the actual mechanism being broken and having to be replaced with another one which shall logically fulfill the said function.

Similarly, complex manipulations are required when it comes to mounting and fixing, for it is difficult, with conventional systems and devices, to hold the assembly whilst it is being manipulated to be locked in the window of the vehicle bodywork shell.

Wherever mounting and/or dismounting is relatively simple, or poses no serious problems, then fixing is not sufficiently rigid, clearances being created within short time periods which result in noise and bother for the actual user.

DESCRIPTION OF THE INVENTION

The system subject hereof has been devised to fully solve the above drawbacks and is based on the accessory to be fixed being linked to a mechanism with a pyramid-shaped protuberance, that could in principle be described as being "incomplete", projecting therefrom, the contour of its base having a small slot in which a thin plastic holding blade will be inserted having an identical window as the shell of the vehicle bodywork, with a rectangular, circular and other outer contour, depending on the projecting base of the mechanism to be held, wherein said thin plastic blade allows said mechanism as a whole to be held to the self-supporting element (ceiling, door panel, etc.), once the latter has been sandwiched between the blade and the base of the pyramid-shaped protuberance.

The thickness of said blade plus the shell thickness must equal the width of the slot at the base of the pyramid-shaped protuberance, specifically in a small vertical skirt on the perimeter of such a base and in which the slot is logically cut, which shall be taken up by the relevant fringe on the exterior of both windows once insertion has been completed.

The pyramid-shaped protuberances are considered "incomplete", as noted hereinbefore, because if the bottom of the slot provided in the skirt of the pyramid-shaped base should define therein a smaller square section than that of its base, albeit with dimensions identical with those of the shell window, then insertion would not be possible. Now then, if two quadrants of the pyramid can be cleaved off (as defined by planes parallel to the axis and to the traces of the diagonals from the base) in order for two facing edges to remain immovable, namely the edges lying between two parallel planes equidistant from the plane defined by these two edges and another plane perpendicular thereto, shifted parallel to the other diagonal such that the section defined leaves the dimension of the window diagonal on the outside of its base, and if the edge remaining between the two parallel planes is made to be able to flex from the peak toward the main axis, then it will be possible for the distance between the vertices of this and the opposite edge to be equal to or less than the shell window diagonal, thereby for the pyramid defined by these four edges altogether to be able to enter the windows, moving diagonally and its fixed part being inserted over the two adjacent sides of the windows, the flexible part being supported on the opposite corner, thereby being clipped and fulfilling in principle the coupling function.

If a solid body, hereinafter referred to as a supplementary wedge element, which may or may not be solidly attached to the mechanism, is sandwiched under pressure between the fixed and flexible portions, a perfect fixing will be achieved by embedding which will in many applications more than suffice for this purpose to be fulfilled.

Nevertheless, faced with heavy stressing, the system may be complemented with an additional moveable part to finish off or replace the pyramid sections initially eliminated, the total supporting effect on the outer perimeter of the window being therefore completed and its effect being therefore resisting. It is also noteworthy that it is in this case necessary to sandwich a supplement under pressure between the fixed and the moveable portions in order to cause a suitable side embedding against all four sides of the window.

Having regard to the above-mentioned two cases, it can indeed be assured that the supporting effectiveness at the perimeter can reach up to 46% in the case of the full pyramid and 67% in the latter case. Now then, if the effectiveness of the first case is compared with the second case, the difference is only 10% lower, which confirms what was said hereinbefore regarding to less demanding applications.

The system described may also be used on windows with a slightly greater side, using two side integrated runners that shall to some extent replace the second case referred to above, albeit without a central clippable member, in which case its effectiveness would remain at 46%.

DESCRIPTION OF THE DRAWINGS

In order to provide a filler description and contribute to an easier understanding of the characteristics of the invention, a set of drawings is attached to the present specification as an integral part thereof which, while purely illustrative and not fully comprehensive, shows the following:

FIG. 2. Is an exploded view of how a mechanism, specifically a hanger, is mounted in accordance with the option shown in FIG. 1A.

FIGS. 7A and 7B. Are each views of how the mechanism shown in the preceding figure is pre-mounted and definitively fixed, in accordance with the mounting option shown in FIG. 1C.

PREFERRED EMBODIMENT OF THE INVENTION

Figure 1A:
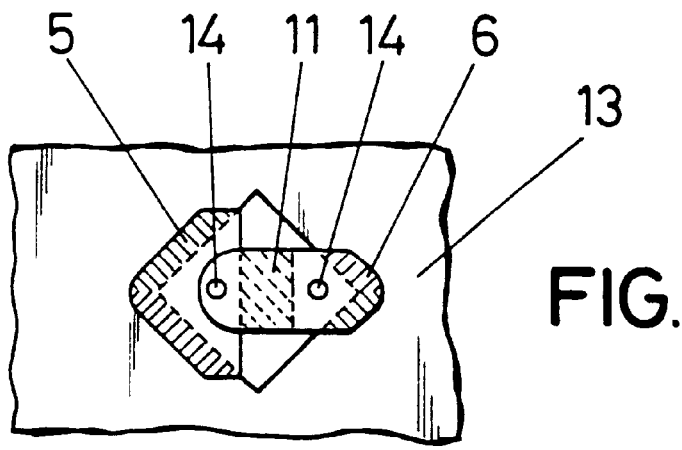
FIGS. 1A, 1B, and 1C. Are each schematic plan close-views of the three mounting forms matching the three cases referred to above.

Before going into a description of the preferred embodiment and certain different applications, in order to clarify the relevant description with reference to each and every single figure, where reference is made to a certain component or element, the reference numeral shall always be the same, even if its application or shape should differ.

Bearing the foregoing in mind, reference numeral (1) will always identify the mechanism and/or accessory that is to be held or fixed, whereas reference numeral (2) will so identify the pyramid-shaped protuberance from said mechanism (1), and reference numeral (3) will identify the slot provided at the skirt (4) on the base of said protuberance (2). Similarly, reference numeral (5) identifies the fixed part of said protuberance (2) and reference numeral (6) the resilient part thereof.

Furthermore, the self-supporting element or module in which the above-mentioned mechanism will previously be inserted will be given reference numeral (7), the same being provided with a window (8) to allow the above-mentioned protuberance (2) through, the plastic holding blade being identified with reference numeral (9) and the window of said plastic blade with reference numeral (10). The supplementary wedge element is in one case referred to as (11) and in another as (12), as shall be explained hereinafter, whereas the vehicle bodywork shell or element will be allocated reference numeral (13).

Bearing the foregoing in mind, FIG. 1 is a schematic plan view showing the first mounting option in which the fixed portion (15) of the pyramid-shaped protuberance (2) enters two adjacent sides of the respective window of the structural bodywork element (13), whereas the flexible portion (6) is arranged at the corner diametrically opposite said same window, a supplementary wedge element (11) being provided for definitive fixing or locking.

Figure 1B:
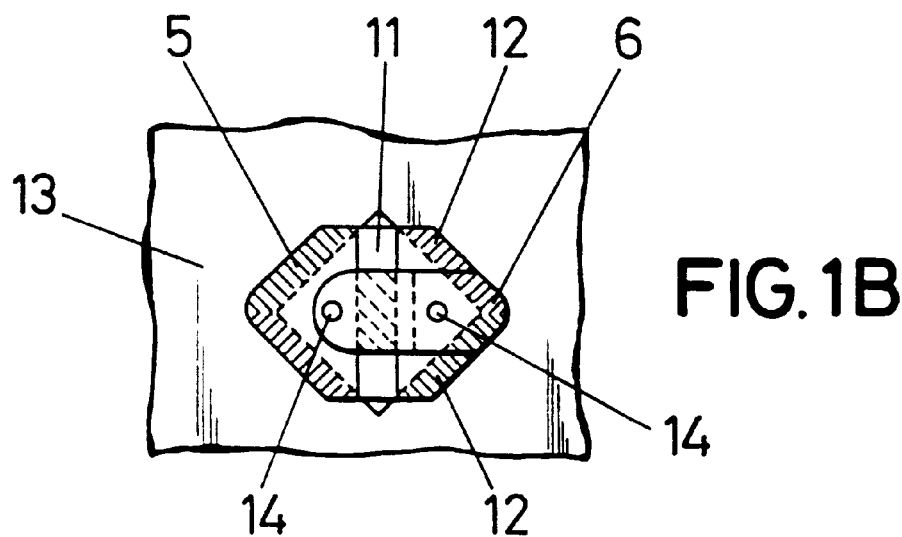

FIG. 1B shows the second mounting option, albeit in this case with complementary insertions (12) completing the pyramid effect of the respective protuberance.

Figure 1C:
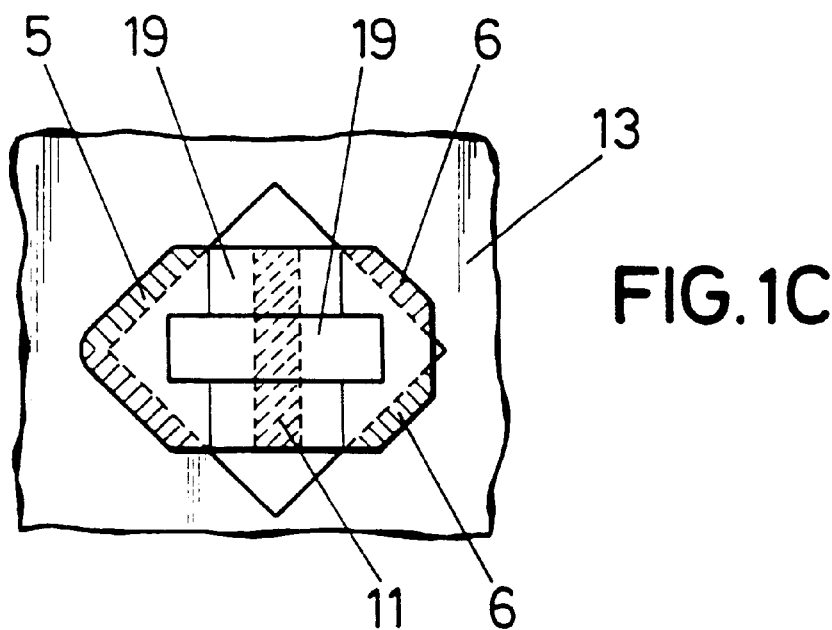

In FIG. 1C, the mounting window of the bodywork element (13) is slightly larger, and the mechanism at issue has supplementary non-adjacent displaceable wedge elements (6) whose effectiveness is similar to that of the first option shown in FIG. 1A, having a pair of resilient plastic blades (9) in addition to the supplementary wedge element (11).

FIG. 2 is an exploded view of how a mechanism and/or accessory (1), specifically a hanger, is mounted by means of the system of the option shown in Figure 1A, the mechanism (1) at issue being provided with a pyramid-shaped protuberance (2) with its fixed (5) and resilient (6) portions, and the skirt (4) in which the respective slot is provided. Now then, in this mounting, a hole or window (8) is made in the relevant self-supporting element (7), which in this case comprises a ceiling, the size of the window being slightly greater than that of the perimeter of the skirt (4) in the pyramid-shaped protuberance (2), and thus when the latter is inserted in said hole (8), it is attached to the self-supporting element (8) by means of a complementary resilient plastic blade (9) provided with a window (10) the size of which will match the size of the respective window purposely provided in the relevant bodywork structure or element (13). Upon the pyramid-shaped protuberance (2) being inserted through the hole (8) and the slot (3) of the former in the window (10), the mechanism (1) is attached to the self-supporting element (7), thereby allowing the relevant turning or probing manipulations to be made in order to effect the housing in the respective hole or window of the bodywork shell or element (13), and once housed therein, have it embedded by means of the wedge effect of the supplementary element (11), thereby securing the application.

Figure 3A:
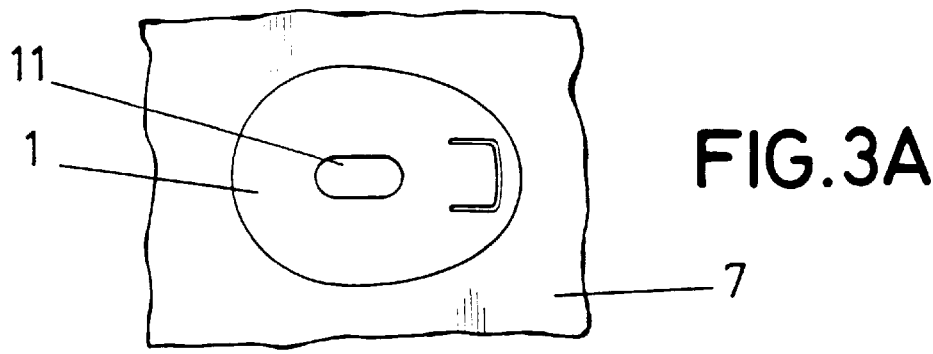
FIGS. 3A, 3B, 3C, 3D and 3E. Are cross-sectional plan views with supplementary wedge elements, without supplementary wedge elements, with an accessory mechanism, namely a hanger, definitively mixed, and a plan view of the visible mounting face shown in the preceding figures, all in accordance with the mounting option of FIG. 1.

FIG. 3A shows the mechanism (1) inserted in the visible face of the self-supporting element (8), wherein the supplementary wedge element is identified with reference numeral (11), as described above.

Figure 3B:
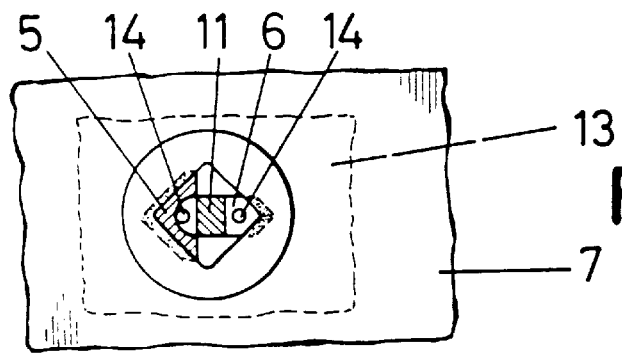

FIG. 3B shows a cross-section of the attachment and fixing system shown in the preceding figure, which cross-section is made at the height of the outer portion of the structural bodywork element (13), showing it clearly clipped and locked by the wedge element (11), moreover showing the pair of holes (14) useful for dismounting the assembly.

Figure 3C:
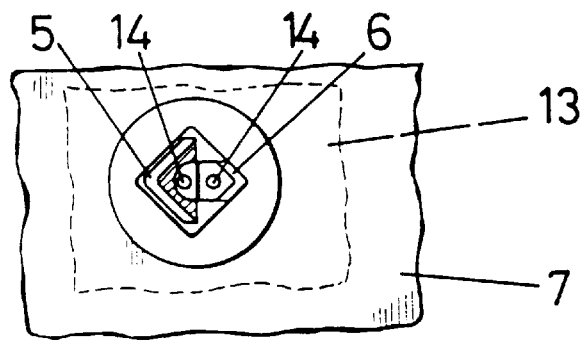

FIG. 3C is analogous to the preceding figure albeit devoid of the supplementary wedge element (11), the resilient portion (6) lying next to the fixed portion (5) of the pyramid-shaped protuberance upon being inserted in the window of the structural bodywork element (13) or upon being expelled therefrom, by approximation using pointed pliers on the holes (14).

Figure 3D:
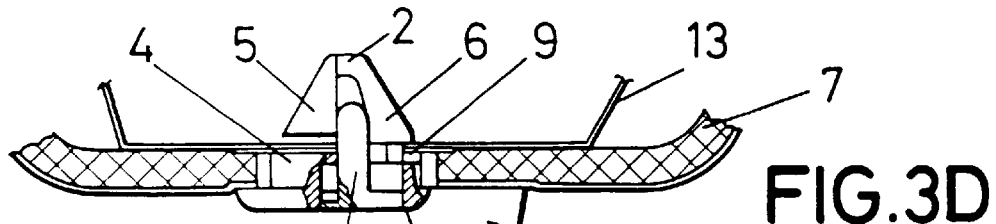

FIG. 3D shows the mechanism which in this case consists of a sunshade support, as it would be mounted on the structural bodywork element (13), showing how both the thickness of the shell forming such a structural bodywork element (13) and the resilient plastic blade (9) are housed in the relevant slot or groove (3) purposely provided in the skirt (4) of the mechanism (1), specifically at the base of the pyramid-shaped protuberance (2).

Figure 3E:
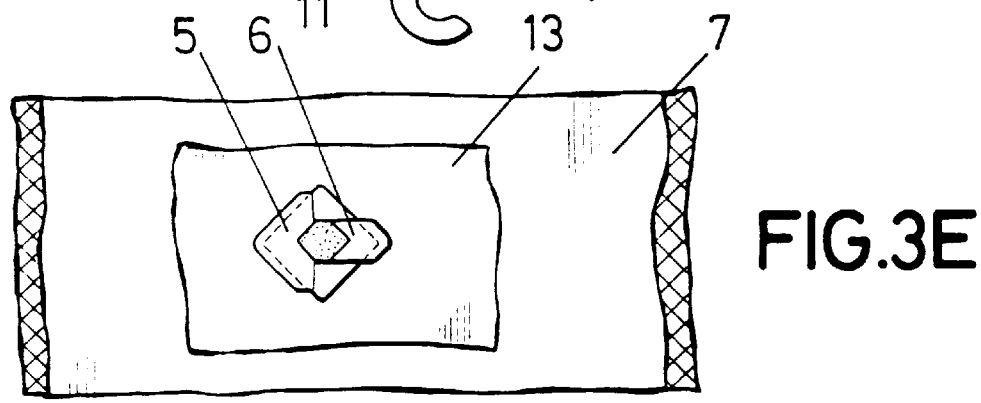

FIG. 3E shows the appearance, in plan view, of the definitive fixing, as observed from inside the structural bodywork element (13).

Figure 4:
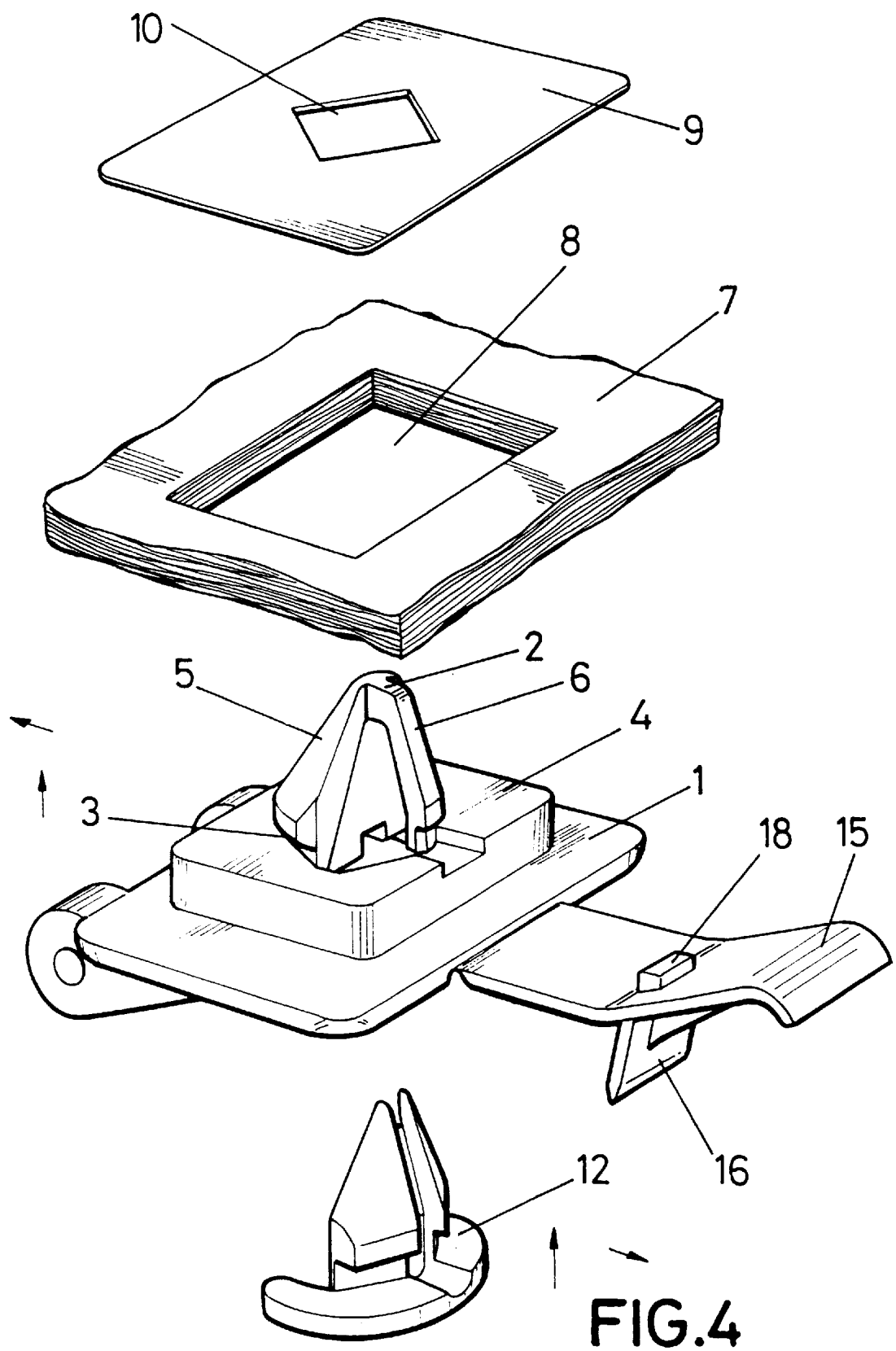
FIG. 4. Is an exploded view of how a mechanism or accessory is mounted in cordance with the option shown in FIG. 1B.
Figure 5:
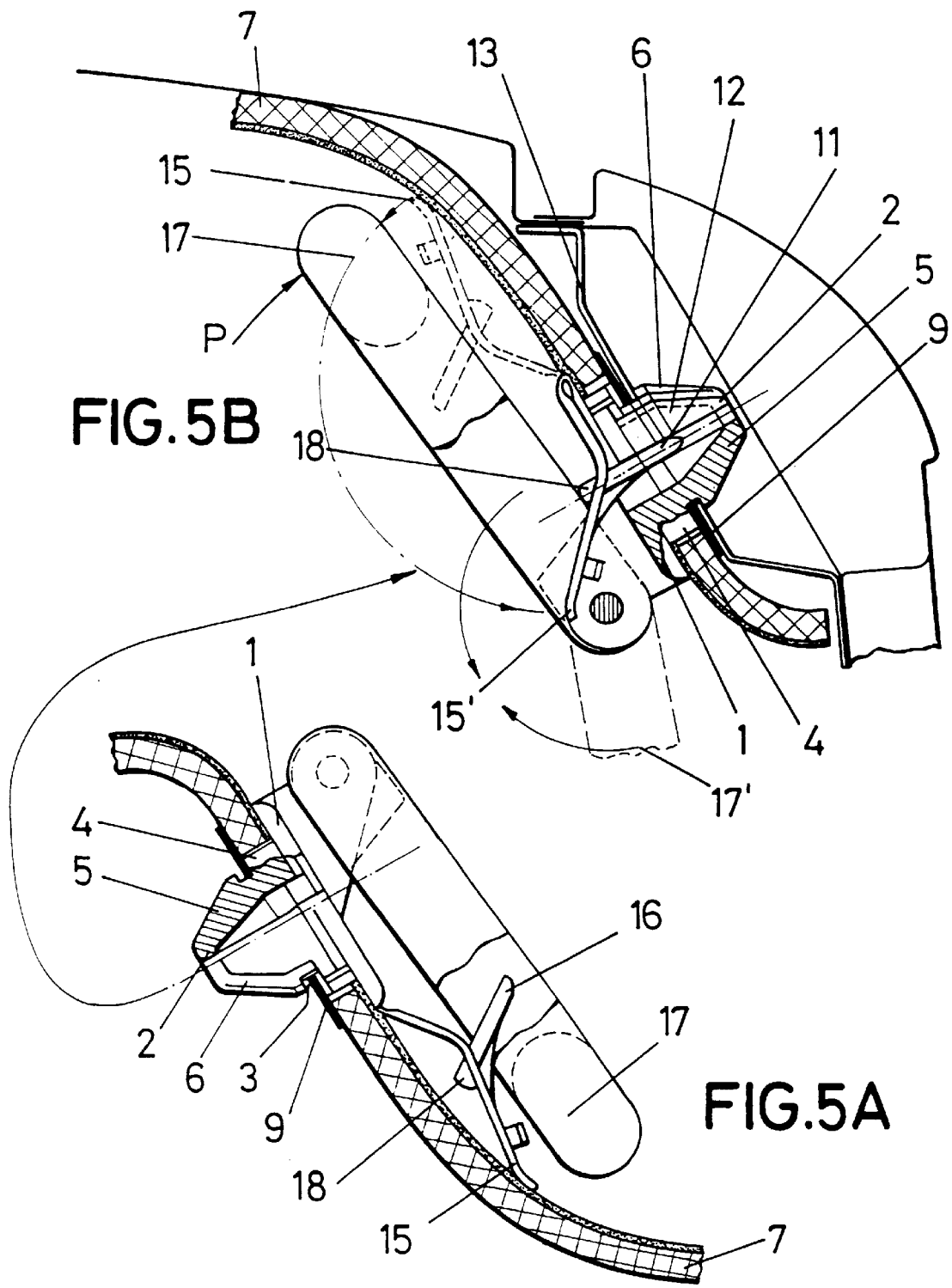
FIGS. 5A and 5B. Are each views of the mechanism of the preceding figure in a pre-mounting position and in a definitive fixing position, in accordance with the mounting sequence of said FIG. 4.

FIG. 4 shows a mechanism (1) forming what could be deemed to be a grip support, with a cover (15), in which the mechanism (1) includes the skirt (4), the protuberance (2)

with its fixed (5) and resilient (6) portions, wherein as shown in this FIG. 4, said pyramid-shaped protuberance (2) is inserted in the window (8) of the self-supporting element (7) and also passes through the window (10) of the flexible blade (9) in order to hold the mechanism (1), the foregoing in accordance with the application or mounting case shown in FIG. 1B, in such a way that in this case a complementary insertion (12) is inserted to complete the pyramid-shaped protuberance (2), wedging it with the tab (16) that forms an integral part of the actual cover (15) of the support of the grip or mechanism (1) at issue, which operation is carried out by simply turning and slightly pressing the grip (17) on the projections (18) from the actual cover (15), which forms an integral part thereof, as shown in FIGS. 5A and 5B.

With reference to FIG. 5A, the same shows the position of the mechanism or grip (1) pre-mounted on the self-supporting element (7), which in this case consists of a ceiling, the sequence of FIG. 4 being followed, whereas in FIG. 5B it is now arranged definitely mounted on the structural bodywork element (13); in order to definitively fix it thereto, the grip (17) need only be turned to position (17'), and the cover (15) to position (15'), for the tab or projection (16) to begin to enter between insertion (14) and the fixed portion (5) of the pyramid-shaped protuberance (2). When the grip (17) is returned to its initial position, only P need be pressed, as shown in FIG. 5B, for the desired embedding to take place on the bodywork (13), and for the cover (15) to take up its final position (15'); as noted hereinbefore, this mounting matches the option shown in FIG. 1B.

Figure 6:
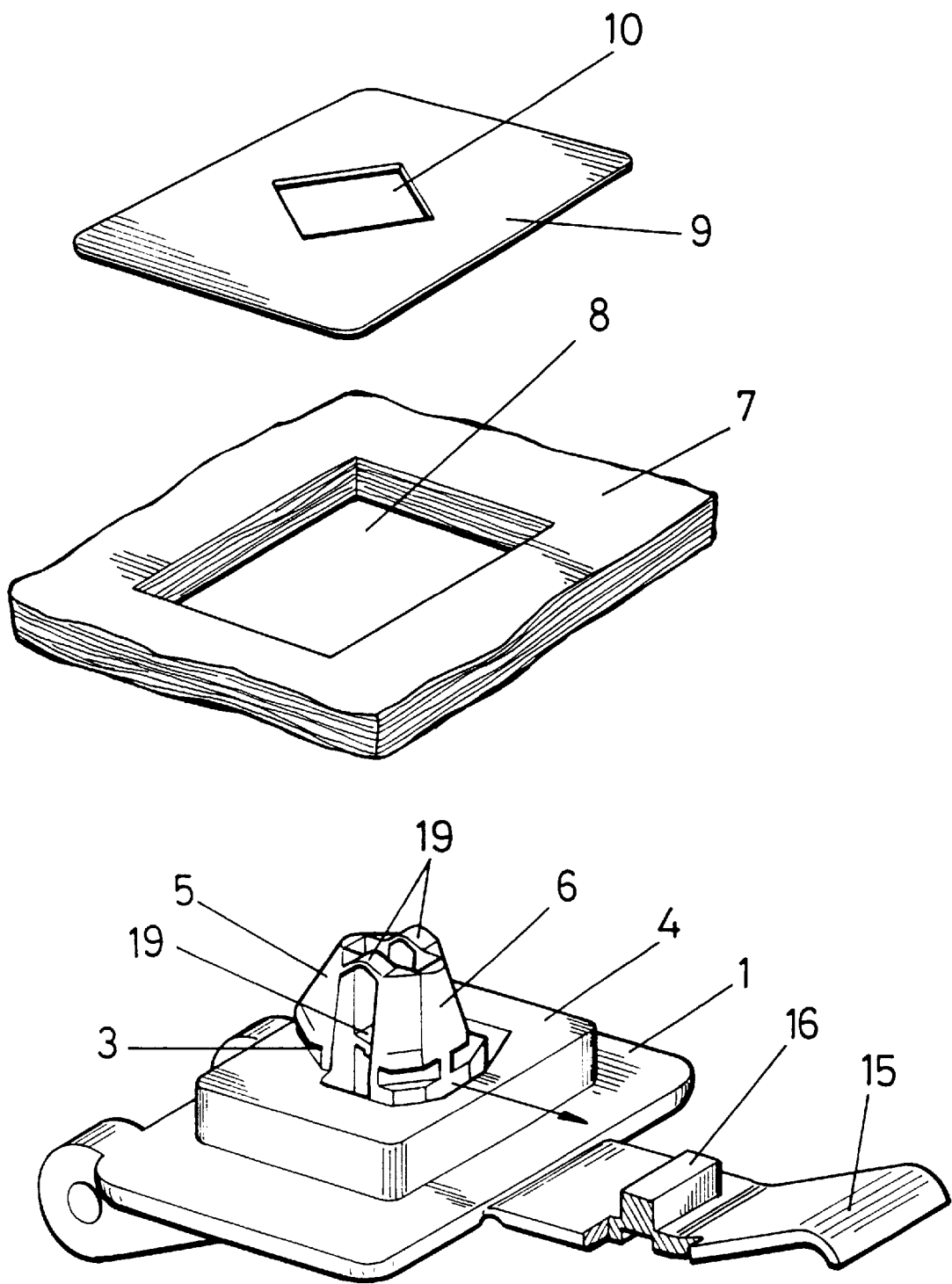
FIG. 6. Is an exploded view of a pre-mounting similar to that of FIG. 4, albeit in accordance with the option of FIG. 1C.

FIG. 6 shows a pre-mounting sequence similar to that of FIG. 4, using a mechanism with all its mobile parts integrated therein, through resilient blades (19). Upon being mounted on the bodywork, the fixing option for this system will be as shown in FIG. 1C.

FIG. 7 shows how a grip or anchorage mechanism of the kind shown in the preceding figure is pre-mounted, wherein displacement of the resilient portion (6) is enabled by the deformation of the resilient blades (19) which initially act as springs, allowing the plastic blade (9), with which attachment is effected as aforesaid, to enter the window (10), thereafter for the respective structural bodywork element (13) to be entered.

FIG. 7B finally shows the mechanism shown above and now definitively fixed to the bodywork (13), wherein embedding on the window is shown to take place by locking the projection or salient (16) and simultaneously pushing the fixed (5) and resilient (6) portions.

What is claimed is:

1. A system for coupling and securing an accessory of plastic material to bodywork of a vehicle, said system comprising:

a base on said accessory, a protuberance of pyramid shape extending from said base, said protuberance including a rigid portion secured to said base and a flexible portion secured to an upper end of said rigid portion and extending downwardly in opposition to said fixed portion to form a space with said base and provide flexibility of said flexible portion, a self-supporting element having a hole through which said protuberance is insertable, a resilient blade having a shaped hole into which said protuberance is inserted after passing through said hole in the self-supporting element, said flexible portion of said protuberance being capable of undergoing deformation when passing through said hole in the blade to be secured therebehind and to hold the blade against the self-supporting element, said protuberance defining a slot with said base into which said blade and said self-supporting element are fitted when the protuberance is inserted through said hole in the blade, the bodywork of the vehicle having a hole corresponding in shape to the shaped hole in the blade so that said protuberance can be inserted into said hole in the bodywork and be secured thereto with the bodywork also fitted in said slot, and a locking member engageable in said protuberance between said rigid and flexible portions to hold said flexible portion in a deformed state in locked position behind the bodywork.

2. A system as claimed in claim 1, wherein said holes in said blade and in said bodywork are rectangular.

3. A system as claimed in claim 1, wherein said locking member has a rectangular cross-section.

4. A system as claimed in claim 1, wherein said flexible and rigid portions of said protuberance have holes which are accessible when the locking member is removed from the protuberance to enable the rigid and flexible portions to be brought together to separate the accessory from the bodywork.

5. A system as claimed in claim 1, wherein said accessory includes a movable member which is movable to a position at which the movable member pushes said locking member into said protuberance.

6. A system as claimed in claim 1, wherein said flexible portion of said protuberance has a lower free end spaced from said base, and a supplementary enlarged part is provided at said free end.

7. A system as claimed in claim 1, wherein said flexible blade is made of plastic material.

8. A system as claimed in claim 1, wherein said flexible and rigid portions of the protuberance are of V-shape pointed away from one another.

* * * * *